Feb. 1, 1938.  G. E. GAUS  2,107,071
BALE IDENTIFICATION TAG AND A METHOD FOR AFFIXING THE SAME
Filed Feb. 4, 1937
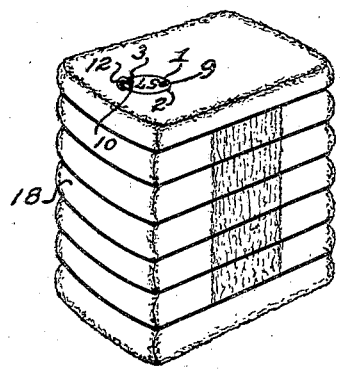
FIG. 1.
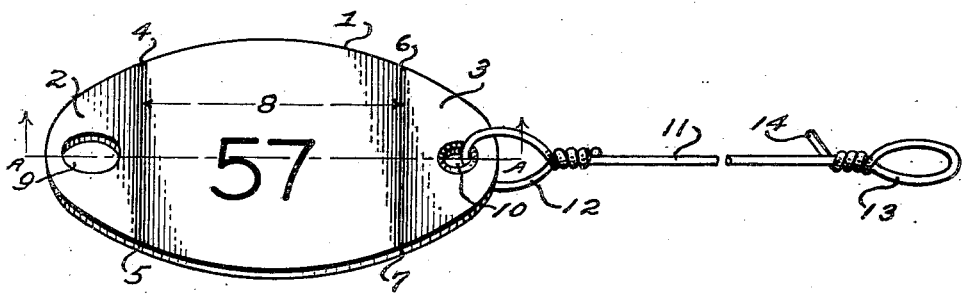
FIG. 2.
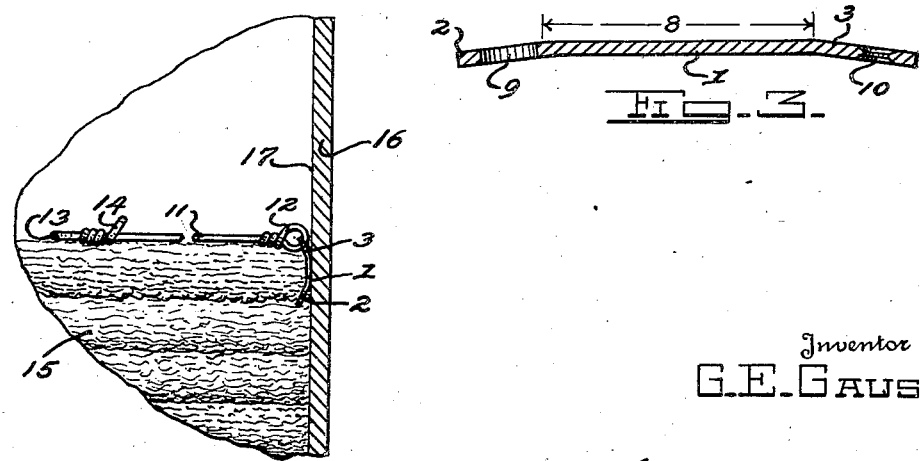
FIG. 3.
FIG. 4.
Inventor
G. E. Gaus
By
Attorney.

Patented Feb. 1, 1938

2,107,071

UNITED STATES PATENT OFFICE

2,107,071

BALE IDENTIFICATION TAG AND A METHOD FOR AFFIXING THE SAME

George E. Gaus, Washington, D. C., assignor to Secretary of Agriculture of the United States of America Application February 4, 1937, Serial No. 123,983

2 Claims. (Cl. 40—20)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

My invention relates to improvements in identification tags for fibrous material packed in bale form, and particularly to cotton bales, whereby the particular bales to which the tags have been applied may be identified in the event the customary means of identification are effaced, destroyed, or changed, and has for its object to provide a single durable identification tag, adapted to be displayed on the outer surface of the bale, flexibly connected to a securing member automatically impacted with the fibrous material during the process of baling in such manner that the identification tag cannot be readily removed or replaced after the fibrous material has been baled.

A further object of my invention is to provide a structure and form for the identification tag, arranged in such manner that the facets and edges of the tag normally in sliding contact with the interior surface of the bale press-box during the process of baling, will readily pass over rough, worn and/or uneven portions of the bale press-box side walls; thereby insuring retention of the position of installation of the tag relative to the outer surface of the bale without the aid of especial tag holders, or guides, or the dressing of the interior surfaces in order to provide a smooth pathway for the tag in its line of travel within the press-box.

In order to carry out the purposes of my invention reference is to be had to the peculiar combinations and arrangements of parts as shown in the accompanying drawing, forming a part of this specification, in which similar numerals refer to similar parts throughout the several views.

Referring to the drawing,

Figure I is a perspective view of a completed bale with the identification tag visible on the outer surface of the head of the bale.

Figure II is a perspective view of the identification tag assembly.

Figure III is a cross-section of the identification tag taken on the bisection line A—A of Figure II.

Figure IV is a side elevation of the identification tag assembly at the initial position of installation.

Referring to the drawing by numerals, plate-like elliptical tag head 1 visible on the outer surface of the head of the bale (Fig. I) is formed of substantially non-resilient durable material, preferably a steel of high melting point and non-corrodible properties. Suitable portions of the opposite ovoid ends, 2—3, of tag head 1, are fashioned in retroversion with respect to the upper or identification-bearing surface of tag head 1 as shown in Fig. III. The above described structure results in a relatively flat portion 8, remaining in the mid-section of tag 1, shown in Fig. II, as the area lying within the points 4—5—6—7. The lines of deviation 4—5 and 6—7 between mid-section 8, and bent ovoid ends 2—3, are substantially at right angles to the line A—A (Fig. II) bisecting tag head 1. The function of the gibbous elliptical structure of tag head 1, is hereinafter described in the discussion pertaining to the practice of my invention. Ovoid ends 2 and 3 have apertures 9 and 10 centered on line A—A, respectively, formed therein. Anchoring member 11, a rod or wire of non-resilient material and in length less than the distance between the head and the bottom of the completed bale, is fashioned with eyelet 12 at one end and eyelet 13 at the opposite end. Eyelets 12 and 13 lie in planes at right angle to each other. Angularly protruding barb 14, a continuation of the wrapped portion of eyelet 13 about the straight section of anchoring member 11, lies in a plane parallel to that of eyelet 12 and at right angles to that of eyelet 13. Tag head 1 is flexibly connected to anchoring member 11 by means of eyelet 12 and aperture 10. Aperture 9 may be used as a connecting means for the conventional paper bale shipping tags.

While the foregoing described simple structure is a preferred embodiment of the anchoring means 11, I do not wish to be restricted thereto.

My invention may be practiced while fibrous material 15 is being fed into the press-box 16, and at a time when the press-box 16 is partially filled, by inserting therein identification assembly 1—11 (Fig. IV), by means of the upper unenclosed portion of press-box 16. Tag head 1 is inserted between fibrous material 15 and the interior wall 17 of press-box 16, having the substantially convex surface of the tag head contact the press-box wall 17 and the anchoring member 11 extended away from the tag head 1, longitudinally of the press-box 16, and superimposed upon the surface of the fibrous material 15 placed in press-box 16. The balance of the fibrous material composing the bale 18 is introduced into the press-box, thereby burying the anchoring member 11, and the process of baling is then completed in the customary fashion.

Upon completion of the baling process, tag head 1 (Fig. I) appears on the outer surface of the bale 18 dangling from eyelet 12, which protrudes partially from the body of the bale 18; the remainder of the anchoring member 11 is firmly held and confined within the bale 18.

During the process of baling the identification tag assembly 1–11 moves with the fibrous material vertically of the compressing direction, having the tag head 1 in sliding frictional contact with an interior wall 17 of press-box 16.

The curvilinear periphery of the tag head is capable of gliding through the depressions and rough areas frequently found in the interior walls of press-boxes; the offset ovoid ends, forming inclined planes with the flat center portion, of the tag head are capable of riding over the obstacles frequently found on the interior walls of press-boxes; the flat center portion of the tag head is capable of bridging uneven portions of the side walls frequently found in the interior of press-boxes; the flexible and eccentric connection between the tag head and eyelet 12 permits sidewise motion of the tag under such a stress; the underside of the flat center portion of the tag head, presenting the largest contact area to the expansive pressure of the fibrous material, causes the outer surface of said flat center portion to lie flush against the interior wall surface of the press-box during its movement with the fibrous material; and in combination, forming a tag head adapted for uninterrupted and uniform cooperative movement of the tag with the fibrous material that is formed into a bale.

It is readily apparent that the above described shape, boundary form, and facets defining the structure of the tag operate in close mutual functional relationship with each other producing a definite and desired result during the process of baling, not assured in the use of conventional types of shipping tags.

I am aware that others have devised exposed bale tags with means for insertion in the contents of the bale during the process of baling, notably: Gaus 1,996,328 "Apparatus for affixing identification tags"; Richberger 969,658 "Shipping-tag"; and Wilson et al. 1,125,618 "Fastening for shipping-tags". The single flexibly connected dependent tag herein described is designed to operate in the conventional types of press-boxes, frequently found with uneven and worn interior surfaces, without the aid of a guidance means or means for providing a plane surface for travel of the tag along the press-box side wall during formation of the bale. Gaus, above, teaches a holder which provides a guidance and a smooth pathway for the tag. Richberger's teachings are primarily directed to an identification tag arranged in duplicate; one of the tags having means formed thereon for holding the same in the bales, is spaced apart by flexible uniting means from the other tag which is adapted to be displayed on the outer surface of the bale. Neither tag in Richberger is adapted to overcome any obstacles it may encounter in its path of movement within the press-box during the normal process of compression of the material into a bale. Wilson et al. teaches and claims a plurality of interchangeable tags mounted on the ends of fastening or securing members passing through and projecting beyond opposite faces of the bale. Said tags are attached to the fastening or securing members after the process of compression of the material into a bale is completed, by bending, or entwining, or drawing the projecting ends of the securing members against the faces of the tags so as to hold the tags snug or tight against the faces of the bale. In Wilson et al. the teachings are primarily directed to a fastening for shipping-tags, no structure being disclosed supporting the cooperative movement of the identification tag member and the bale material during the process of baling. The drawings accompanying the patents of Gaus, Richberger and Wilson et al., illustrating the preferred embodiment of their devices, disclose no means residing in the exposed tags, adopting said tags for uninterrupted and uniform cooperative movement of the tag with the bale material during the conventional process of forming a bale, as is accomplished by the tag hereinbefore described.

While the foregoing is a preferred embodiment of the means for practicing my invention, I do not wish to be restricted thereto.

Having thus described my invention, I claim as new and desire to secure by Letters Patent:

1. In combination with a press box having fibrous material therein to be baled; of a tagging device therefor to be affixed during the process of baling; said tagging device comprising a securing member, and a non-resilient plate-like pendent identification tag connected thereto; said securing member adapted to be embedded in the fibrous material as the same is being assembled and to extend partially therethrough; said tag comprising a substantially gibbous elliptical structure, having a relatively flat center portion formed thereon, and adapted to maintain its position relative to said securing member during the process of embedment and impaction of said fibrous material, and having its concave surface in juxtaposition thereto and its convex surface in juxtaposition to a side wall of the press box.

2. In combination with a press box having fibrous material therein to be baled; of a tagging device therefor to be affixed during the process of baling; said tagging device comprising a securing member, and a non-resilient plate-like pendent identification tag connected thereto; said securing member adapted to be embedded in the fibrous material as the same is being assembled and to extend partially therethrough; said tag embodying a curvilinear periphery and a flattish center portion, adapted to have indicia stamped upon the upper surface thereof, contiguous with oppositely disposed declivous end portions forming in combination a substantially arch-like structure, said periphery, flattish center portion, and declivous end portions adapted to act in mutual functional relationship to permit uniform cooperative movement of the tag and embedding member with the contents of a bale while being packed, the convex surface of the tag being in juxtaposition to a side wall of the press box.

GEORGE E. GAUS.